(No Model.)
S. P. CHANDLER.
HARNESS TUG.
No. 481,471. Patented Aug. 23, 1892.
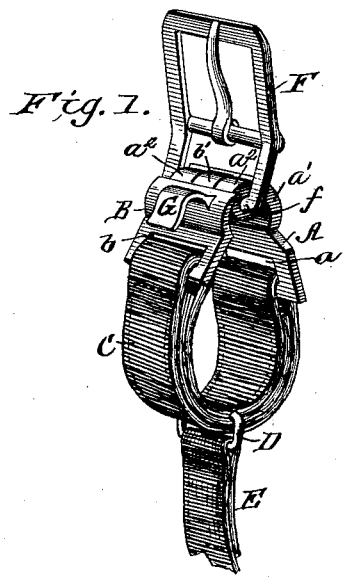
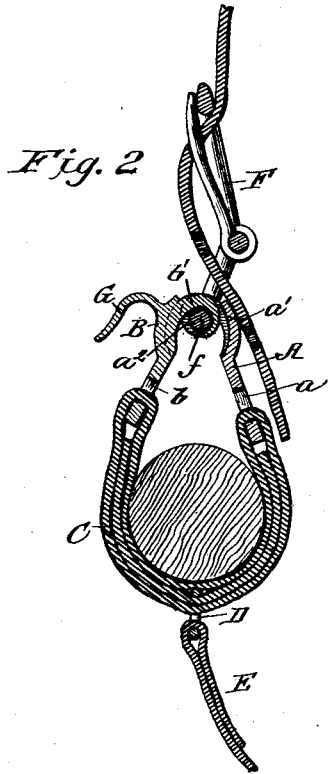
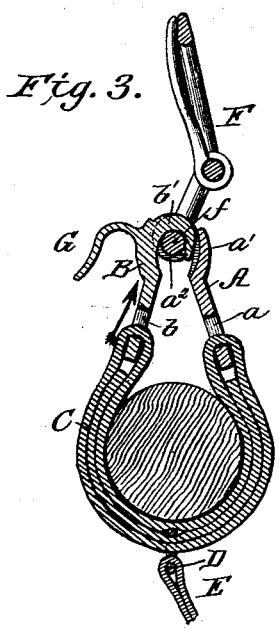
WITNESSES:
Fred G. Dieterich
M. D. Blondel
INVENTOR:
S. P. Chandler.
BY Munn & Co
ATTORNEYS

UNITED STATES PATENT OFFICE.

SAMUEL P. CHANDLER, OF LAKE CITY, SOUTH CAROLINA.

HARNESS-TUG.

SPECIFICATION forming part of Letters Patent No. 481,471, dated August 23, 1892.

Application filed November 25, 1891. Serial No. 413,022. (No model.)

*To all whom it may concern:*

Be it known that I, SAMUEL P. CHANDLER, residing at Lake City, in the county of Williamsburg and State of South Carolina, have invented certain new and useful Improvements in Harness-Tugs, of which the following is a specification.

My invention relates more especially to thill-tugs; and it has for its object to provide a tug of this character which will be simple in construction, cheap as to cost, and effective for its desired purpose; and it consists in the peculiar combination and novel arrangement of parts such as will be fully described in the specification, and particularly pointed out in the claims, reference being had to the accompanying drawings, in which—

Figure 1 is a perspective view of my improved harness-tug. Fig. 2 is a vertical section of the same on the line 2 2, Fig. 1; and Fig. 3 is a similar view illustrating the manner of unhitching the tug from the thill.

My improved tug comprises the metallic sections A B, the lower ends of which have loop portions $a$ $b$, to which are connected the ends of the tug or loop-strap C, which strap forms the loop proper, which supports the thill, as shown, a ring or bail portion D being secured to the lower portion of the loop-strap C, with which connects one end of the girth-strap E.

The sections A and B are arranged to be interlocked and detachably connected, whereby when desired they may be readily separated to allow of the unhitching of the horse from the shafts. To this end I provide the section A with an outwardly-curved portion $a'$, the upper portion of which has its ends formed with inwardly-projecting apertured ears $a^2$ $a^2$, through which passes the lower member $f$ of the saddle-strap buckle F, which is connected to the saddle-strap, as shown. By this construction it will be noticed that the member $f$, while serving as a connection for the buckle to the member A, also serves as a locking member, which engages the hook member $b'$ of the section B, such hook member being formed of the shape most clearly illustrated in Fig. 2 of the drawings, by reference to which it will be seen that its locking-hook passes over the member $f$ and extends under the same when the parts are in the position shown in said figure and prevents the sections becoming separated, the section B being further provided with concaved lateral extensions, which seat over the ears $a^2$ $a^2$, as shown.

By reference to Figs. 1 and 2 the application of my improved tug will be readily understood. When it is desired to detach the harness from the thills, the operator by grasping the finger-piece G and forcing the section B inward to the position shown in Fig. 3 will bring the hook member $b'$ in such a position that the section B can be lifted up and away from the section A.

Having thus described my invention, what I claim as new, and desire to secure by Letters Patent, is—

1. A thill-tug, substantially as herein described, comprising a yielding loop portion C, having rigid end sections A and B, the section A, having apertured ears $a^2$ $a^2$, the buckle F, having a pivot-bar $f$ journaled in such ears, and the section B, having a hook member $b'$ arranged to lock over the pivot-bar $f$, such hook member adapted to extend under the bar $f$ when the loop is distended and adapted to be detached when the members A and B are closed in, substantially as and for the purpose described.

2. In a thill-tug, the combination of the loop C, having a member A formed with apertured ears $a^2$ $a^2$, the buckle F, having a pivot-bar $f$ held in said ears, and the rigid member B, having a hook member $b'$ adapted to engage the bar $f$ between the ears $a^2$ $a^2$ and be held in a locked engagement therewith and provided with a finger or lifting portion G, all arranged substantially as and for the purpose described.

SAMUEL P. CHANDLER.

Witnesses:
J. L. C. MOORE,
S. M. ASKINS.